United States Patent [19]

Wilkening

[11] Patent Number: 4,635,273

[45] Date of Patent: Jan. 6, 1987

[54] METHOD AND APPARATUS FOR THE THERMAL PRODUCTION OF METAL CARBIDES AND METALS

[75] Inventor: Siegfried Wilkening, Alfter-Oedekoven, Fed. Rep. of Germany

[73] Assignee: Vereinigte Aluminium Werke Aktiengesellschaft

[21] Appl. No.: 406,890

[22] Filed: Aug. 9, 1982

Related U.S. Application Data

[62] Division of Ser. No. 211,054, Nov. 28, 1980, Pat. No. 4,441,920.

[51] Int. Cl.[4] .............................................. H05B 3/60
[52] U.S. Cl. .................................... 373/120; 373/123
[58] Field of Search ............... 373/111, 119, 120, 122, 373/123, 58; 75/10 R; 432/95, 96, 99

[56] References Cited

U.S. PATENT DOCUMENTS 4,025,610  5/1977  Suzuki et al. ...................... 373/111
4,261,857  4/1981  Nakao ................................ 373/120

Primary Examiner—Roy N. Envall, Jr.
Attorney, Agent, or Firm—Darby & Darby

[57] ABSTRACT

A method and apparatus for the continuous production of metals and/or carbides by thermal reduction is described. In the process, a mixture of metal oxide and carbon is agglomerated, each piece of agglomerate encased in carbon and/or graphite, the carbon casing serves as a housing of the agglomerate during the reducing reaction and as an electrical resistance element for heating of the agglomerate, the encased agglomerates are coked and reduced to metal carbide in a tightly-packed form. Extraction of the metal from the carbide is effected with a halide of the same metal.

6 Claims, 4 Drawing Figures

METHOD AND APPARATUS FOR THE THERMAL PRODUCTION OF METAL CARBIDES AND METALS

This is a division of application Ser. No. 211,054, filed Nov. 28, 1980, now U.S. Pat. No. 4,441,920, issued Apr. 10, 1984.

The present invention relates to a method and apparatus for the thermal production of a group of metal carbides and/or metals wherein a mixture of metal oxide and carbon is reduced to metal carbide and the metal then extracted from the metal carbide. Carbon or graphite is used to encapsulate the agglomerates of the metal oxide and carbon. The carbon capsule or jacket serves as a housing for the agglomerate during the reducing reaction. The amount of carbon required for reduction of the metal oxide and formation of the carbide is provided in the agglomerate. The group of metals to which the invention pertains include the carbide-forming (generally considered hard-to-reduce) metallic elements aluminum, boron, silicon, titanium, zirconium, tantalum, niobium, molybdenum, tungsten and uranium.

It is a particular object of the invention to produce aluminum in the form of a pure metal, in a two-stage process, via the intermediate product aluminum carbide, but to generally reduce the oxides of the other metals mentioned above only to the stage of stable carbides.

The thermal processes for producing the above-mentioned carbides and metals generally differ quite substantially from one another and are usually tailored to the particular metal concerned. The method according to the present invention permits the production of these metal carbides and at least partial extraction of the metals therefrom according to a common principle. Using aluminum as an example, the basic problems of carbothermic reduction of metal oxides that are hard to reduce, as well as details of the method according to the invention, will be described in greater detail.

The known single stage methods for the thermal direct reduction of aluminum oxide with carbon have thus far not been proven to be of value in commercial practice due to chemical, physical and procedural problems. In particular, it has not been possible to develop a continuous industrial process.

The chemical problems are primarily due to the fact that, in accordance with thermodynamics, the reduction of aluminum oxide with carbon will first lead over the intermediate stage of oxycarbide to the formation of aluminum carbide ($Al_4C_3$). Aluminum carbide formation is basically favored over aluminum formation. Through a reduced supply of carbon during the reduction process, formation of aluminum carbide can be suppressed and the proportion of aluminum increased. However, with a decrease in the quantity of carbon present, the competing reaction leading to the formation of volatile aluminum suboxide ($Al_2O$) is increasingly favored. Thus, the increasing volatilization of the aluminum oxide used in the process must be reckoned with, if aluminum formation is to be increased in the known processes.

The course of reduction in the prior art processes is furthermore hindered because the preferentially formed aluminum carbide dissolves both in aluminum oxide and aluminum. Although the dissolved aluminum carbide can be further converted with aluminum oxide to aluminum, under practical conditions this reaction does not proceed exclusively in the direction of aluminum.

Another aggravating circumstance is the relatively narrow temperature range of 2050 to 2150 degrees centigrade that must be maintained for the aluminum oxide reaction to achieve a favorable yield in aluminum. Beginning at about 2000 degrees centigrade, an undesirable vaporization of the aluminum is noticed. For the formation of aluminum carbide according to the invention the preferred reduction temperatures lie between 1950 and 2050 degrees centigrade. At these temperatures and with a sufficient carbon supply, the vaporization losses through aluminum suboxide and aluminum can be kept to a minimum. The required narrow temperature range of around 2000 degrees centigrade poses a serious technical problem for the reduction process for producing aluminum carbide.

The physical difficulties of carbothermic aluminum production are that the molten aluminum oxide (melting point around 2050 degrees centigrade) is specifically heavier than the liquid aluminum. A molten mixture of aluminum oxide, aluminum carbide and carbon (which mixture is present in greater quantity than the tappable aluminum) collects at the bottom of the reducing furnace. Also, graphitized carbon which can form during the reduction process has about the same density as liquid aluminum. An enrichment of aluminum carbide leads to hard-to-melt compositions (as aluminum carbide constitutes a solid phase) and with higher concentrations in aluminum oxide or aluminum increases the melting points of the binary mixtures.

The problems of a carbothermic aluminum oxide reduction shown here to be of a chemical and physical nature naturally lead to considerable procedural difficulties. Because of the required high reduction temperatures electric arc furnaces were principally used for industrial aluminum oxide reduction, as is customary in electrometallurgy. Only in small-scale tests were directly or indirectly heated resistance furnaces used; the heating elements consisting of carbon or graphite. Neither electric arc furnaces nor other electrical heating systems used hitherto have proven successful for the carbothermic production of aluminum.

In addition to single-stage reduction of aluminum oxide to aluminum, two-stage processes have also been proposed wherein a mixture of aluminum and aluminum carbide that can be tapped in the liquid stage is produced first in an arc furnace, and then the aluminum separated from the $Al$—$Al_4C_3$ melt by liquation in the presence of a flux or obtained via an aluminum subchloride distillation. According to another proposed method, the aluminum-containing melt products are mechanically prepared by hot milling and the aluminum then separated by straining. The control of the reduction process in the arc furnace and the oxide-free tapping of the very hot and relatively light $Al$—$Al_4C_3$ melt present enormous difficulties.

A three-stage process for thermal aluminum production has also been proposed in which aluminum carbide is produced as an intermediate product. With a limited amount of carbon the aluminum oxide is reduced to a gaseous mixture of $Al_2O$, $Al$ vapor and $CO$. The mixture of $Al_2O$ and $Al$ vapor (distilled out of the reducing furnace) is then converted with an excess of carbon to aluminum carbide. In a third stage, the aluminum carbide is decomposed to aluminum and carbon at temperatures of 2000 degrees centigrade and pressures of 20 to 50 torr. The aluminum is condensed as a liquid or solid.

The drawbacks of this three-stage process lie in the fact that the thermal decomposition of aluminum carbide under vacuum is extremely difficult to bring about. Additional difficulties complicate the complete reaction of $Al_2O$ with the carbon to form $Al_4C_3$ and the reverse reaction of Al vapor with CO.

An overview of the known carbide processes of thermic aluminum production is given by E. Herrmann in the journal "Aluminium" 1961, No. 4, pages 215–218.

To facilitate explanation, the present invention is described with reference to the production of aluminum and aluminum carbide. It should be understood that this is a non-limiting example of the process of the present invention, which can be used to prepare other metals and their carbides.

It is an object of the present invention to avoid the drawbacks of the prior art processes and to provide a method and apparatus for the continuous production of aluminum carbide and metallic aluminum. According to the invention, this object is achieved by agglomerating a mixture of aluminum oxide and carbon, encasing each piece of agglomerate in carbon and/or graphite, coking and reducing the so agglomerated bodies in tightly-packed form to yield aluminum carbide and extracting the aluminum carbide with aluminum fluoride.

The first important step of the process according to the invention involves the proper selection of charging material and its preparation. A fine-particle aluminum oxide is mixed with a carbon carrier of good binding property. The particulate aluminum oxide material preferred for use in the invention is of the type commonly used for feeding the electrolytic cell of a smelting operation. Preferably, the oxide particles have an average particle size of about 50 micrometers and a maximum particle size of 180 micrometers (This means all of the oxide particles pass an 80 mesh (Tyler) sieve.) As the carbon carrier, it is possible to use carbon binders such as tars, pitches, resins or especially the so-called extracts from solvent and pressure extraction of bituminous coals. These materials can be used alone or mixed with powdered carbon or coke particles.

The green mixture of aluminum oxide and carbon binder is agglomerated into small briquettes. Agglomeration in the sense of the present text refers to processes for making fine-particle materials into lumps, as described in the journal "Chemie-Ingenieur-Technik" 51 (1979), No. 4, Pages 266–188. One agglomeration technique suitable for use in the present invention consists of mixing the alumina, carbon powder and a pitch binder at elevated temperatures in a mixer or kneader and compacting the green mix to form shaped briquettes on a roll type briquetting press. Preferred briquettes are, for example, isometric cylinders, balls or pillow-shaped briquettes which can be formed in large numbers on ringroll mills or bench presses. The size of the briquettes is between about 1 and 10 cm in diameter (for ball or cylinder shaped articles), or 1–10 cm height or thickness (for briquettes in rectangular or flattened shapes). The preferred briquette dimensional range is between about 3 and 6 mm (diameter, height, or thickness depending on shape). The compacted and formed mixture of aluminum oxide and carbon binder is then surrounded with a shell of exclusively carbon. This shell is developed from a likewise plastically formable mass, as prepared for example from petroleum coke powder and pitch. The briquette of the charging material can be compared with the structure of a hazelnut, the mixture of aluminum oxide and carbon binder serving as the core and low-ash coke dust and pitch serving as the shell. This carbon shell can be pressed around or rolled on, as in pelletizing.

The green briquettes are then subjected to a coking process. In this process, the pitch inside the shell and the carbon binder inside the core are transformed into solid carbon or coke. The coked pitch inside the shell has to fulfill the task of a good binder coke since high strength requirements are made on the carbon shell. The carbon shell must withstand certain compression, impact and abrasion stresses in the subsequent stages of the process. The wall thickness of the shell is exactly dimensioned so that the outer cover of the core mixture will be equal to the stresses to which the briquette is subjected. The exact wall thickness that is selected is varied and depends on the nature of the stresses, impact and compression that is present in the subsequent process steps, the thickness being greater with increasing stress or abrasion. The coked carbon shell serves the additional tasks of conducting the electric current and as an electrical resistance element for heating of the agglomerate.

Generally speaking the carbon or graphite capsule or jacket serves as a housing for the agglomerate during the reducing reaction. The amount of carbon required for reduction of the metal oxide and formation of the carbide is provided in the agglomerate.

In the process, the briquettes are heated by electrical resistance heating. According to the invention, in a compact mass of briquettes (i.e. one in which a mass of briquettes are in contact with one another) the electric current flows mainly from briquette to briquette over the carbon shells. In the reduction of the aluminum oxide with carbon to aluminum carbide the carbon shell remains as a sturdy casing. The carbon shell of the briquettes insure that the electrical resistance conditions and heat supply remain largely uninfluenced by changes in the core during reduction. The reducing gas leaves the core via the naturally existing porous channels in the carbon shell. The carbon shell also serves as a small transporting vessel for the aluminum carbide produced by the reaction.

The strength of the core mixture of oxide and coke is of minor importance. The coking residue of the carbon binder in the core mixture as reducing carbon for the aluminum oxide and is sufficient for the induction to aluminum carbide. In the coked core mixture, for example, the coke content and/or the reducing carbon amounts to about 30–35%. The invention will be further explained with reference to the drawing in which, FIG. 1 depicts a cross sectional view of a ball shaped briquette used as a charging material in the present invention;

Figure 1:
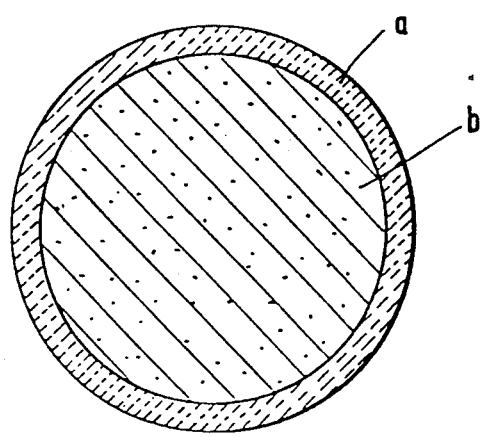

FIG. 1 shows a cross sectional view of a ball-shaped briquette of the charging material. In this drawing, a denotes the carbon shell and b denotes the core mixture of aluminum oxide and carbon. Prior to being placed in the reducing furnace, the green briquettes must be coked or calcined. The calcining takes place either separately from the reducing furnace in shaft, tunnel or rotary tubular furnaces up to temperatures of about 800–1000 degrees centigrade or directly in a preliminary stage of the reducing furnace. Since the briquettes must all be heated to the reducing temperature a combined furnace unit for both calcining and reducing will save energy.

Figure 2:
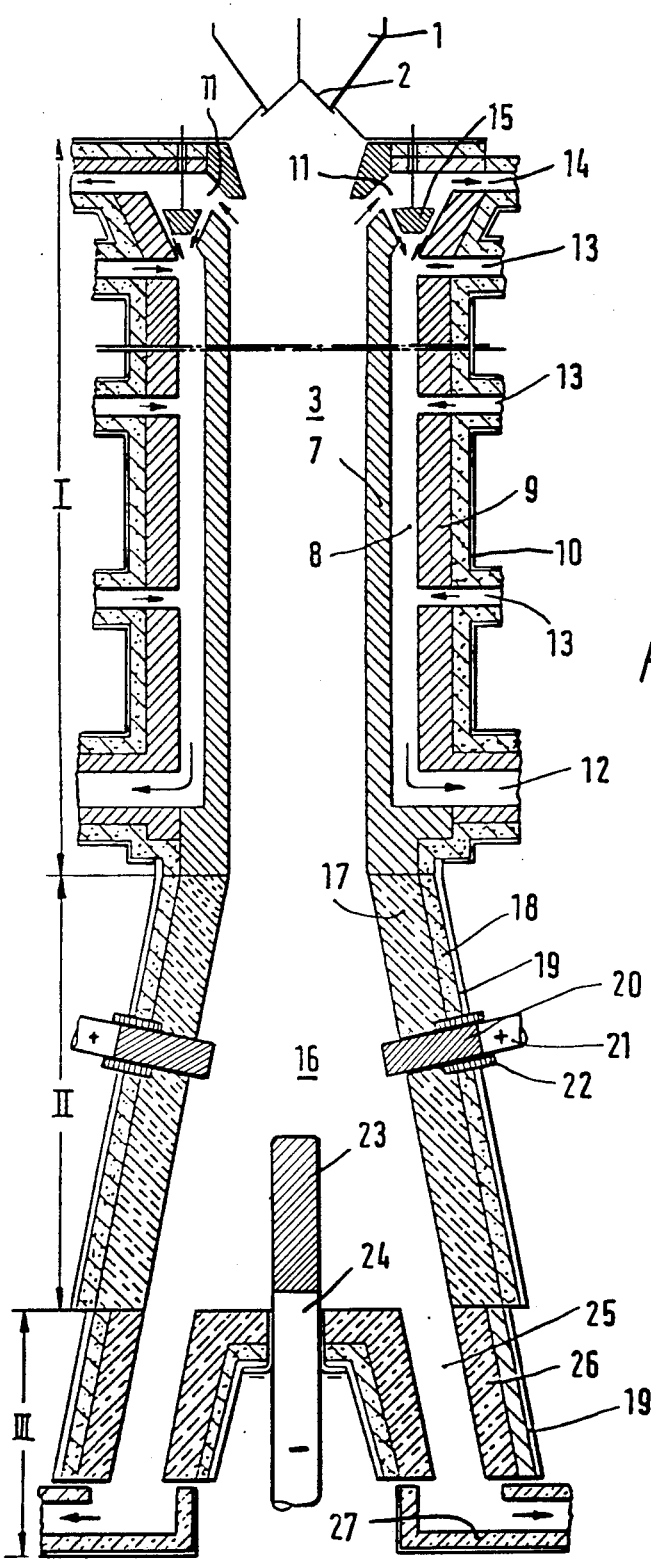
FIG. 2 depicts a cross sectional view of a combined calcining and reduction furnace according to the invention.

FIG. 2 illustrates a combined calcining and reducing furnace. The briquettes are heated and calcined in the indirectly heated (e.g., by means of gas) shaft section I of the furnace. The reduction of the aluminum oxide takes place by direct electrical resistance heating in furnace section II. The reduced material is removed in furnace section III.

The charging material from the briquettes is introduced via a hopper 1 and entry port 2 into the vertical muffle space 3.

The inside wall 7 of the vertical muffle 3 is constructed of silica bricks or fire clay bricks having an alumina content greater than 60%. The flues 8 have exterior refractory walls 9. The furnace has an exterior shell 10, preferably of steel. During the descent and heating of the charging material in the furnace, the volatile pitch components from the shells and the binder of the core mixture are expelled if green briquettes are used. Together with the reducing gas from furnace section II, which mainly consists of carbon monoxide, the volatile components leave muffle space 3 through skylights 11. A part of the gaseous mixture of volatile components and reducing gas is led into flues 8 and burned with preheated air, which is conveyed via channels 13. The hot waste gases leave shaft section I via channel 12. From here, the hot waste gases are moved to a heat exchanger (recuperator) for preheating the air. The second part of the gaseous mixture is drawn off via line 14 and burned, e.g., in a boiler plant or otherwise disposed of or recovered. The distribution of the gas streams into flues 8 and line 14 is regulated by valves 15. The heat of combustion of the gaseous mixture of reducing gas and volatile components of the charge is considerably greater than is required for the external heating of the muffle. At the lower end of the muffle space 3, the briquettes reach a temperature of about 1300 degrees centigrade.

From muffle space 3, the precalcined, solid briquettes of the charge move into the reducing space 16 of furnace section II. The electric current for heating of the charge is conveyed through side electrodes 20/21 and central electrode 23/24. The side electrodes 20/21 are positioned in electrically non-conductive tubes 22. The electrodes 20 and 24 consist of electrographite and are screwed onto water-cooled shafts 21 and 24. In the zone of the electrodes, the current, whether alternating or direct current, flows over the bulk formed by the briquettes. The current is adjusted so that temperatures of 1950 to 2050 degrees centigrade are reached there and the core mixture of briquettes is converted to aluminum carbide. Furnace section II is internally lined with carbon bricks 17. A heat-insulating layer 18 of ceramic refractory material is disposed between the carbon brick structure 17 and the water-cooled outer jacket 19.

The core-reduced, aluminum carbide-containing briquettes are removed while hot via the refractory-lined channels 25 in furnace section III and then via vibration chutes 27. The channels 25 are lined with a ceramic material 26 such as mullite or alumina bricks. The discharge temperature lies at about 1500-1600 degrees centigrade. In place of vibration chutes, rotary tables or screw conveyors can be used. The removal and transfer of the fully reduced charging material to containers or directly to an interconnected extraction reactor (e.g., as in FIG. 3) is effected under the exclusion of air.

The process of carbide production described above for aluminum can similarly be employed for other carbide-forming metals that are hard to reduce such as, for example, boron, silicon, titanium, zirconium, tantalum, niobium, molybdenum, tungsten or uranium for which similar difficulties arise in arc furnace reduction as in the reduction of $Al_2O_3$. The advantage of the process according to the invention lies primarily in the fact that the carbides of the aforenamed metals can be obtained in continuous operation. The processes known hitherto for obtaining these metal carbides operate in a discontinuous manner. It is likewise possible to obtain high-melting borides, e.g., titanium boride or zirconium boride, directly from the respective oxides in a continuous operation.

The aluminum carbide obtained from the carbothermic aluminum oxide reduction in carbon capsules constitutes an intermediate product from which the aluminum is to be extracted. The extraction of the aluminum takes place with gaseous aluminum fluoride, $AlF_3$, at temperatures above 1100 degrees centigrade. ($AlF_3$ sublimes at about 1100 degrees centigrade). It is known that aluminum fluoride reacts at high temperatures with aluminum and forms gaseous aluminum subfluoride, $AlF$, which with temperature decrease disproportionates again to aluminum and aluminum fluoride. The transport reaction via the aluminum subfluoride can be used for the extraction of aluminum from its carbide. Temperatures of 1500 to 1600 degrees centigrade are required for the reaction of aluminum carbide with aluminum fluoride to form aluminum subfluoride.

The process according to the invention provides for maintaining a temperature difference, in a closed reactor space, between the reaction sites for formation and disproportionation of aluminum subfluoride, which will allow an automatic continuous process of aluminum extraction.

Figure 3:
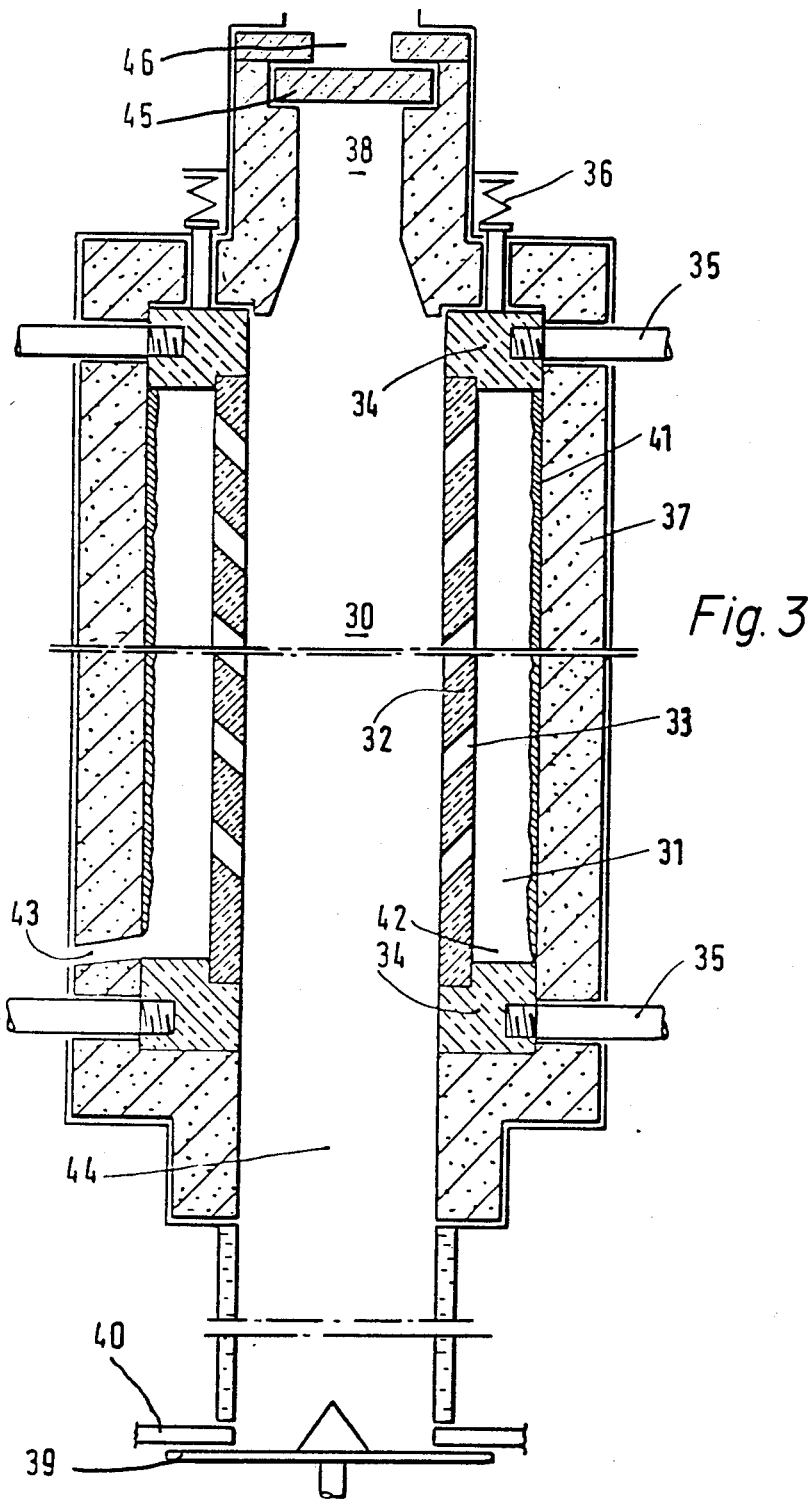
FIG. 3 illustrates a cross sectional view of an extraction reactor according to the present invention.

The extraction reactor and its manner of operation will now be explained more fully with reference to FIG. 3. The extraction reactor consists of a central, cylindrical reaction space 30 and an annular space 31. The central reaction space 30 is formed by a thick-walled graphite tube 32 with oblique windows 33. Graphite tube 32, because of its large size, is composed of individual rings that are inserted into one another. At the top and bottom, graphite tube 32 ends in connection rings 34 made of graphite into which current-carrying bolts 35 are screwed. The contract pressure between graphite tube 32 and connection rings 34 is assured by pressure springs 36. The graphite tube 32 is heated in a resistance process with electric current. At its outer circumference, the reactor is lined with $Al_2O_3$-containing bricks 37. The bricks 37 contain a high quantity (more than 70%) of alumina and may be at least mullite or at maximum pure corundum bricks.

The aluminum carbide-containing material is introduced via a sealable chamber 38 into the central reaction space 30 at an entry temperature of over 1100 degrees centigrade. The carbon material remaining after the aluminum extraction is discharged through cooling space 44 and then via the discharge tray 39 with scraper 40. The central reaction space 30 is also charged with aluminum fluoride when starting the reactor with the aluminum carbide-containing material. The interior temperatures of about 1500-1600 degrees centigrade within reaction space 30 allow the aluminum fluoride to vaporize. The aluminum fluoride condenses in a layer 41 on reactor wall 37. The aluminum fluoride layer 41 brings about an additional heat insulation, its thickness increasing with a sufficient $AlF_3$ supply until the temperature on the inner surface of layer 41 rises to above 1100 degrees centigrade and no further $AlF_3$ is condensed. There is thus formed an $AlF_3$ atmosphere inside the reactor. In the central reaction space 30, the $AlF_3$ reacts at temperatures between 1500 and 1600 degrees centigrade with the aluminum carbide to form AlF which then diffuses through to the cooler reactor wall 37 and to the condensed $AlF_3$ layer 41 respectively, where it disproportionates again to aluminum and gaseous $AlF_3$. In this way, aluminum is constantly transported from the inner space of the graphite tube through windows 33 and annular space 31 to the surrounding wall 41/37. The aluminum deposited there descends down the wall, collects at the bottom 42 of annular space 31 and is drawn off discontinuously through a taphole 43 or continuously through a siphon (not shown in the Figure).

The temperature of the charging material to be extracted must be higher in the transition zone from chamber 38 to central reaction space 30, than the condensation temperature at the surface of layer 41 so that no aluminum deposits on the charge. The charging material is introduced into the extraction reactor through an aperture 46 and a slide closure 45 of refractory material which is opened during charging. This charging device can also be of a different design, e.g., a bell or flap closure. The discharge temperature of the carbon material remaining after the extraction should likewise be higher than the surface temperature of layer 41. The carbon residues in the upper section of cooling space 44 provide an effective heat insulation in downward direction and thus prevent disproportionation of AlF there.

The extraction reactor can have a circular or rectangular cross section. Also several extraction units can be combined into a set.

As mentioned before, the aluminum oxide-carbon mixture is enclosed with a sturdy carbon shell and the $Al_2O_3$—C core reduced to aluminum carbide in a reducing furnace (FIG. 2). Prior to entry into the extraction reactor, the carbon shell is preferably broken up or blasted to allow the $AlF_3$ easier access to the aluminum carbide. Basically, the carbon material discharged from the extraction reactor is returned to the process cycle, i.e., used again for preparing $Al_2O_3$-carbon mixture or encasing in carbon.

In a further preferred embodiment of the invention, one may also use prefabricated carbon or graphite vessels for the aluminum oxide-carbon binder mixture. It is not necessary that the carbon containers enclose the $Al_2O_3$—C mixture all around. Preferred container configurations are cylindrical pots or sleeves that are open on one or both sides. Prefabricated carbon and graphite containers are conveniently used repeatedly in the process cycle until they must be replaced due to wear or breakage.

The use of prefabricated containers is more fully explained in the following example:

Using an extruder device, pipes are extruded from a suitable carbon material (e.g., the same base material used for the shells or casings of the agglomerated particles—petroleum coke filler material and electrode pitch) and then baked at 1200 degrees centigrade in an annular baking furnace or fully graphitized. The carbon tubes are cut into uniform section, i.e., sleeves or rings.

The prefabricated carbon sleeves are filled with a plastic mixture of aluminum oxide, petroleum coke powder and a tar base binder material. To give the mixture inside the carbon sleeve a better grip the sleeves can have inward directed teeth formed along with the extrusions. The filled sleeves serve as charging material both for the reducing furnace according to FIG. 2 and the extraction reactor according to FIG. 3. In shaft section I of the reducing furnace, the $Al_2O_3$—C binder mix is coked, and in the reducing section II the mass is reduced to aluminum carbide. The carbon sleeve is the supporting shell as well as the resistance heating element for the $Al_2O_33$—C mass inside it. In the shaft section, the $Al_2O_3$—C binder mixtures loses, for example, 5-20% of its weight and shrinks as a result. During the reduction to aluminum carbide, the coked $Al_2O_3$—C mass undergoes a further loss in weight of about 55%. Here too, a slight shrinkage occurs. The brown to brown-black aluminum carbide forms a porous, spongy, compressible structure. In the extraction reactor, the hollow spaces between the supporting sleeves of carbon make possible an effective diffusion exchange, i.e., transportation of gaseous $AlF_3$ to the aluminum carbide and carrying away of gaseous AlF.

A slight addition of calcium fluoride and/or magnesium fluoride to the aluminum fluoride in the extraction reactor of up to about 5 weight % has proven to be effective for promoting coagulation of separated aluminum droplets.

The following example provides further details on the thermal extraction of aluminum by the process of invention.

100 parts of powdery alumina with a maximum particle size of 100 micrometers is thoroughly mixed with 24 parts of pulverized petroleum coke and 46 parts of electrode pitch having a softening point of 70 degrees centigrade. The mixing procedure is carried out at a temperature of about 180 degrees centigrade in a heated mixer. The green mixture, still in the warm state, is pressed into short cylindrical graphite tubes on a die press. A specific pressure of 5 N/mm2 is applied for compacting the mixture in the tube. The outer diameter of the tubes is 50 mm, the wall thickness 4 mm and the tube length 100 mm. One tube contains about 110 cubic centimeters of the green mix corresponding to a quantity of approximately 200 grams.

The graphite tubes which are filled with the mixture of alumina, petroleum coke powder, and pitch are charged into the muffle 3 of a reduction furnace as illustrated in FIG. 2. The circular muffle has an inside diameter of 1.5 m and a height of 8 meters. It is heated by means of gas from the outside. The tubes move slowly down the muffle and are heated up to about 1000 degrees centigrade at the lower outlet of the muffle.

During the heating-up operation, the pitch binder is coked, giving a coke-residue of approximately 65%. Thus, 30 parts by weight of coke remain in the mixture from the original 46 parts of pitch, or in other words, the coked mixture is composed of about approximately 65 parts by weight of alumina and 35 parts by weight of carbon.

In the lower section II of the reduction furnace the graphite tubes are brought to a temperature in the range of 1950 to 2000 degrees centigrade. An electric current of 50 kA at a voltage of 60 V is passed through the packing of the graphite tubes serving as a resistor material. The alumina-carbon mixture in the graphite tubes is converted to aluminum carbide. The average residence time of the graphite tubes in the reduction furnace from charging to discharging amounts to about 12 hours.

After the carbide-bearing graphite tubes are discharged from the reduction furnace, they are transferred to an extracting reactor as in FIG. III. A cooling down of the reactor feed below 1200 degrees centigrade is avoided. For this reason, the carbide bearing tubes are conveyed in closed vibrating tubular carriers to the feeding device of the reactor. The central graphite muffle 30 in the reactor provides the heat necessary for the extraction process. The internal diameter of the grapite muffle is 1.2 meters; its height is 6 meters. Extraction proceeds faster than reduction. Thus, the residence time of the carbide-containing graphite tubes in the graphite muffle is only 3.5 to 4 hours. The extraction is a self-maintaining circulating process between two temperatures. The temperature in the graphite muffle is kept close to 1500 degrees centigrade, the surface temperature of the outside wall which is covered with aluminum fluoride slightly above 1100 degrees centigrade. Aluminum is produced at a rate of approximately 300 kg per hour and is tapped at the bottom of the reactor at a temperature of 1100 degrees centigrade. The carbon which is set free by the decomposition of the carbide is removed from the graphite tubes and recycled. Also, the graphite tubes are used again as containers for a new cycle.

Figure 4:
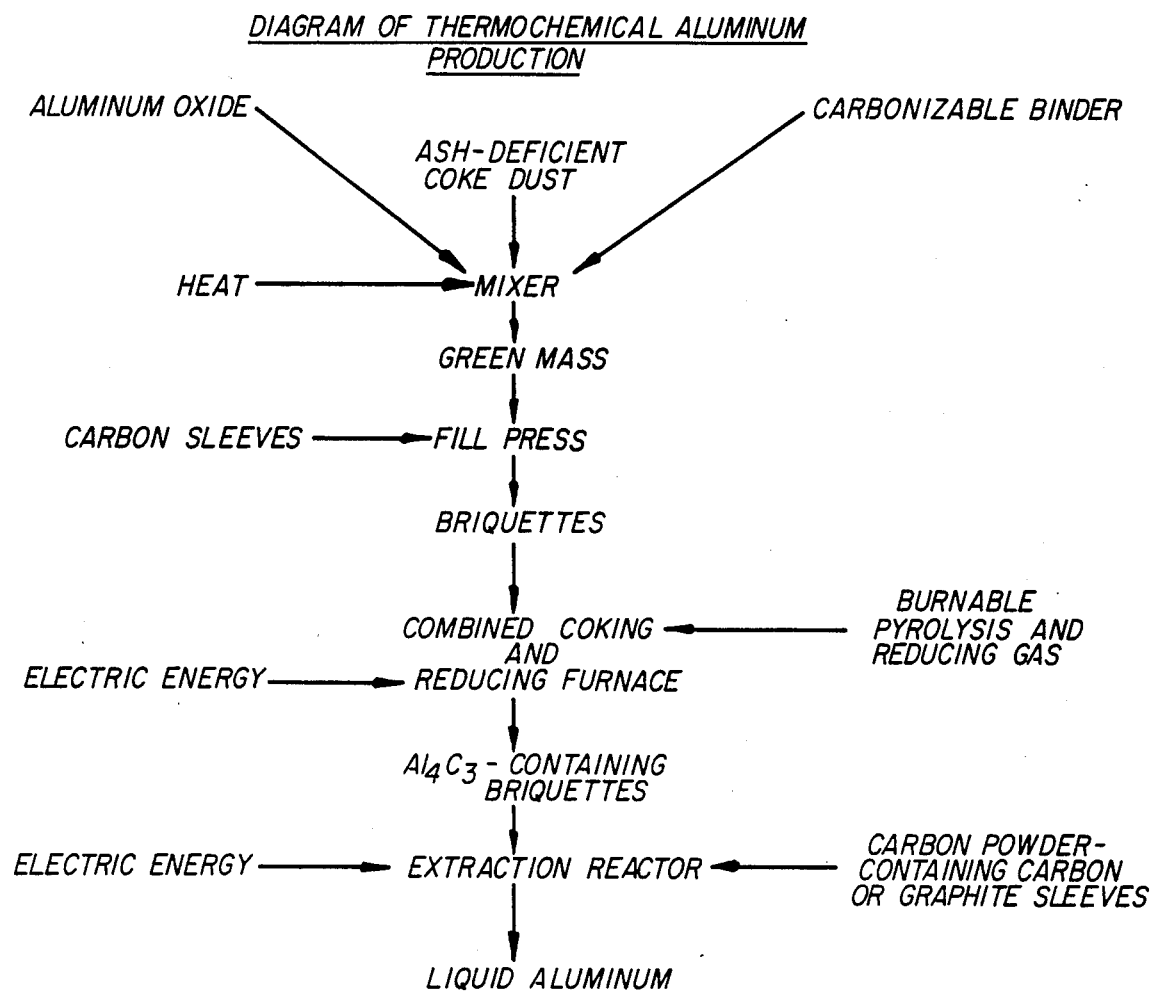
FIG. 4 depicts a flow diagram of the process of the invention.

The flow diagram in FIG. 4 provides a general overview of the various steps of the process according to the present invention.

The aforementioned metal carbides of boron, silicon, titanium, zirconium, tantalum, niobium, molybdenum, tungsten or uranium are hard materials, that are widely used in industry. For the production of hard metals, carbides of titanium, tantalum and tungsten are preferably used. Titanium carbide, TiC, is for example produced according to the process of the present invention in that a mixture of titanium dioxide, carbon black and pitch is prepared so that when coked, 3 mols carbon exist per mol $TiO_2$. The mass of titanium dioxide, carbon black and pitch is pressed into graphite sleeves and the so obtained briquettes charged into the calcining and reducing furnace according to the invention. The reduction to titanium carbide takes place at temperatures of around 2000 to 2500 degrees centigrade. Maintaining of narrowly limited temperature ranges is here not of the same importance as in the preparation of aluminum carbide. The reduction of titanium dioxide can, for example, be coupled with that of tungsten trioxide to directly obtain co-carbides of TiC and WC, as needed for hard metal production.

It is also possible to introduce hydrogen or nitrogen into the reducing furnace from the direction of the discharge end of the process either to improve by means of hydrogen the reduction conditions or to form carbonitrides in the case of nitrogen.

What is claimed is:

1. An apparatus for the thermal production of metal carbides comprising a vertical furnace including an upper inlet section and a lower bifurcated discharge section, said upper and lower sections being in open communication with one another;

an indirectly heated vertical muffle in said upper section for calcining material introduced to said upper inlet section, and at least two electrodes extending into the lower section of said furnace and mounted on the sidewalls thereof, and a third electrode mounted in a discharge area in the center of said lower section, said lower section capable of reducing material calcined in said upper section.

2. The apparatus of claim 1 wherein said lower section comprises a conical opening in which said discharge area is formed.

3. The apparatus of claim 2 further comprising a central, cylindrical reaction space.

4. Apparatus as defined in claim 1 wherein said furnace includes an exterior wall containing a water-cooled jacket.

5. Apparatus as defined in claim 4 further including a series of hollow passage ways for conducting heated gaseous components in the walls of said upper furnace section.

6. Apparatus according to claim 4 wherein said conical lower section comprises discharge channels lined with a refractory material, said discharge channels communicating with at least one vibratory passageway for conducting materials discharged from said furnace to a container or an interconnected extraction reactor in the absence of air.

* * * * *